US008923190B2

(12) United States Patent
Ribeiro et al.

(10) Patent No.: US 8,923,190 B2
(45) Date of Patent: Dec. 30, 2014

(54) METHOD AND APPARATUS FOR SYNCHRONIZING RESOURCES FOR COORDINATED NETWORK DEPLOYMENT

(75) Inventors: Cassio Ribeiro, Espoo (FI); Olav Tirkkonen, Helsinki (FI); Esa Tiirola, Kempele (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 988 days.

(21) Appl. No.: 12/610,836

(22) Filed: Nov. 2, 2009

(65) Prior Publication Data

US 2011/0103317 A1 May 5, 2011

(51) Int. Cl.
| H04W 84/18 | (2009.01) |
| H04W 72/08 | (2009.01) |
| H04W 28/16 | (2009.01) |
| H04W 28/04 | (2009.01) |
| H04W 72/00 | (2009.01) |
| H04W 92/02 | (2009.01) |

(52) U.S. Cl.
CPC ............ *H04W 72/082* (2013.01); *H04W 84/18* (2013.01); *H04W 28/04* (2013.01); *H04W 28/16* (2013.01); *H04W 72/00* (2013.01); *H04W 92/02* (2013.01)
USPC ........................................................ 370/327

(58) Field of Classification Search
USPC .............. 370/208, 210, 281, 295, 310.2, 319, 370/324, 328–339, 343, 344, 349, 350, 436, 370/478, 480, 481, 503–520; 455/59, 60, 455/112, 216, 422.1; 375/261–267, 375/355–376
See application file for complete search history.

(56) References Cited

U.S. PATENT DOCUMENTS

| 2008/0095106 | A1 | 4/2008 | Malladi |
| 2008/0214126 | A1* | 9/2008 | Holt ................................ 455/93 |
| 2008/0219670 | A1* | 9/2008 | Kim et al. ...................... 398/115 |
| 2008/0233964 | A1* | 9/2008 | McCoy et al. ................. 455/450 |
| 2009/0196240 | A1* | 8/2009 | Frederiksen et al. .......... 370/329 |
| 2010/0261469 | A1* | 10/2010 | Ribeiro et al. ................. 455/423 |
| 2010/0329229 | A1* | 12/2010 | Lipka et al. .................... 370/344 |

FOREIGN PATENT DOCUMENTS

| EP | 0985324 B1 | 4/2006 |
| EP | 1678981 A1 | 7/2006 |
| WO | 2005036917 A1 | 4/2005 |
| WO | 2007053954 A1 | 5/2007 |

(Continued)

OTHER PUBLICATIONS

Osseiran et al., Advances in Device-to-Device Communications and Network Coding for IMT-Advanced, Jun. 2009, ICT-MobileSummit 2009 Conference Proceedings, 8 pages.*

(Continued)

*Primary Examiner* — Hoon J Chung
(74) *Attorney, Agent, or Firm* — Squire Patton Boggs (US) LLP

(57) ABSTRACT

In accordance with an example embodiment of the present invention, a method comprises mapping a first transmission channel to an existing channel of a network element; switching the network element to a secondary communication mode which is one of a secondary transmission mode and a secondary receiving mode; signaling at least one neighbor network element in the secondary communication mode to associate the network element with the at least one neighbor network element; and receiving a first signal on the mapped first transmission channel from the at least one associated network element.

16 Claims, 3 Drawing Sheets

(56) References Cited

FOREIGN PATENT DOCUMENTS

| WO | 2008014275 A2 | 1/2008 |
| WO | 2008092160 A2 | 7/2008 |
| WO | 2009022294 A2 | 2/2009 |

OTHER PUBLICATIONS

Doppler et al., Device-to-Device communications; functional prospects for LTE-Advanced networks, Jun. 2009, Communications Workshops, 2009, 7 pages.*

* cited by examiner

METHOD AND APPARATUS FOR SYNCHRONIZING RESOURCES FOR COORDINATED NETWORK DEPLOYMENT

RELATED APPLICATIONS

This application is related to International Application No. PCT/EP2009/064501, titled "METHOD AND APPARATUS FOR INTERFERENCE-RESISTANT WIRELESS COMMUNICATION," filed Nov. 3, 2009, which is hereby incorporated by reference in its entirety.

TECHNICAL FIELD

The present application relates generally to method and apparatus for synchronizing resources for coordinated network deployment.

BACKGROUND

Some wireless networks such as the local area system may utilize the license-exempt spectrum or white spaces made available as television is converted to digital broadcasting to take advantage of the additional available bandwidth. The local area wireless network may offer an efficient device-to-device (D2D) operation environment, particularly in establishing ad-hoc network operations. Often the deployments of local area wireless networks are uncoordinated and various wireless network elements may be put in use on a temporary or semi-temporary basis with little consideration of the resource allocation and interferences between network elements.

One recent trend is to use one wireless technology for both cellular network and local area network to promote seamless integration and interworking. One such example technology is long-term evolution—advanced (LTE-A) network. As such, dynamic time division duplex (TDD) switching points, which demarcate uplink resources and downlink resource for a network element may be used and overhead for switching between transmission and reception, and between the uplink resources and downlink resources may be high and resulting interference may be severe. In a typical network configuration and with a frame structure for TDD operations such as in LTE-A network, uplink and downlink transmissions generally follow different principles and so do their respective control channels. As a result, cancellation of interferences among network elements in a local area network may be difficult, especially when the local area network was deployed in an uncoordinated manner.

SUMMARY

Various aspects of examples of the invention are set out in the claims.

According to a first aspect of the present invention, a method comprises mapping a first transmission channel to an existing channel of a network element; switching the network element to a secondary communication mode which is one of a secondary transmission mode and a secondary receiving mode; signaling at least one neighbor network element in the secondary communication mode to associate the network element with the at least one neighbor network element; and receiving a first signal on the mapped first transmission channel from the at least one associated network element According to a second aspect of the present invention, an apparatus comprises a resource control module configured to map a first transmission channel to an existing channel of a network element, switch the network element to a secondary communication mode which is one of a secondary transmission mode and a secondary receiving mode, signal at least one neighbor network element in the secondary communication mode to associate the network element with the at least one neighbor network element. The apparatus also comprises a transceiver configured to receive a first signal on the first transmission channel from the at least one associated network element.

According to a third aspect of the present invention, an apparatus comprises at least one processor and at least one memory including computer program code. The at least one memory and the computer program code is configured to, with the at least one processor, cause the apparatus to perform at least the following: map a first transmission channel to an existing channel of a network element; switch the network element to a secondary communication mode which is one of a secondary transmission mode and a secondary receiving mode; signal at least one neighbor network element in the secondary communication mode to associate the network element with the at least one neighbor network element; and receive a first signal on the first transmission channel from the at least one associated network element.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
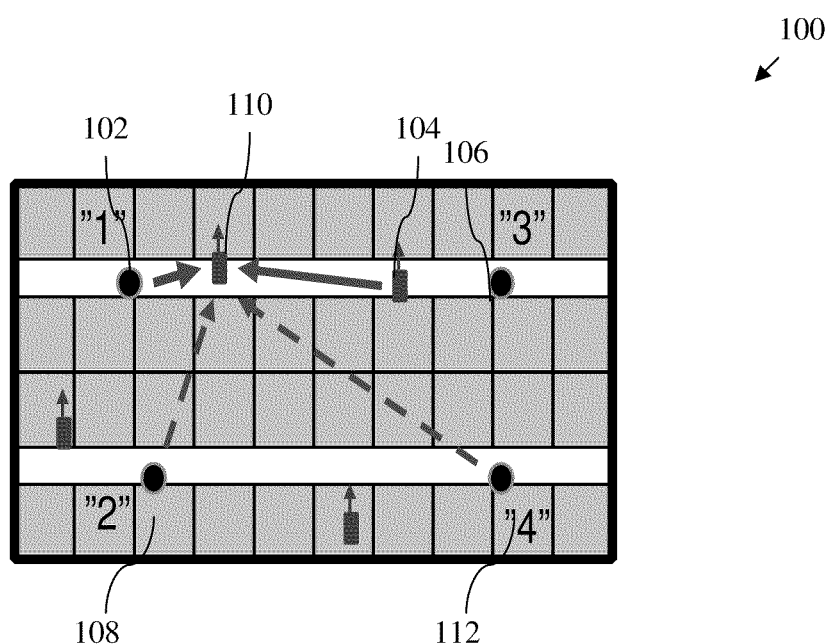
FIG. 1 illustrates an example local area wireless network in accordance with an example embodiment of the invention.
Figure 2:
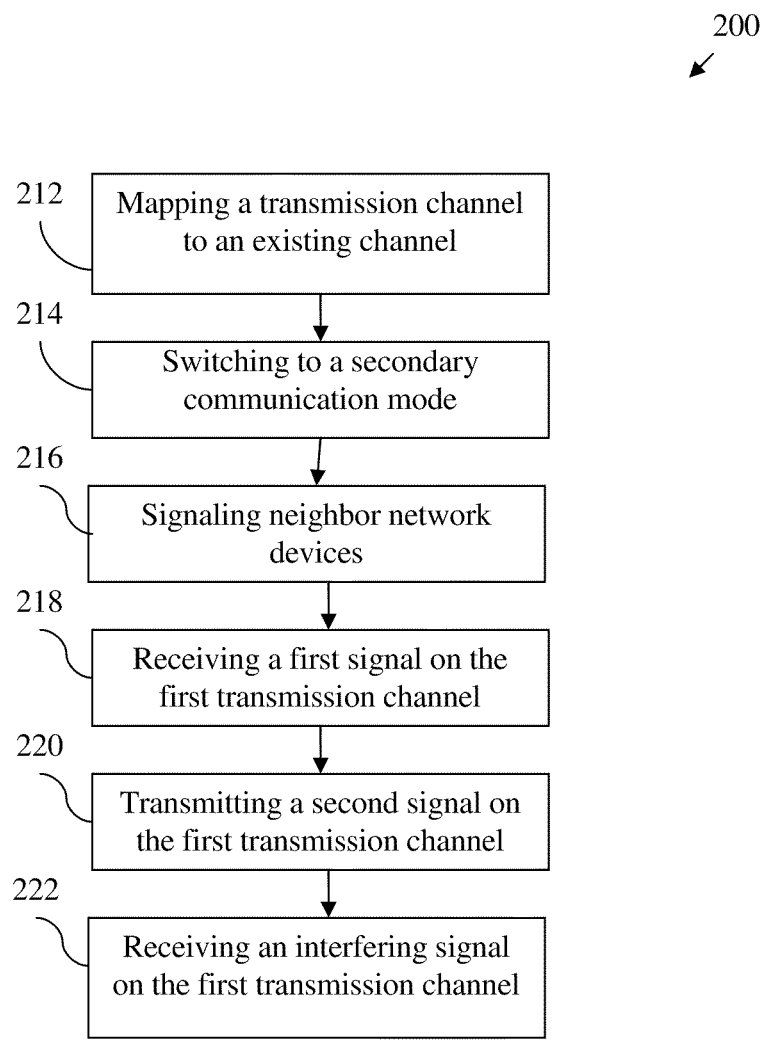
FIG. 2 illustrates an example method for resource synchronization in accordance with an example embodiment of the invention.
Figure 3:
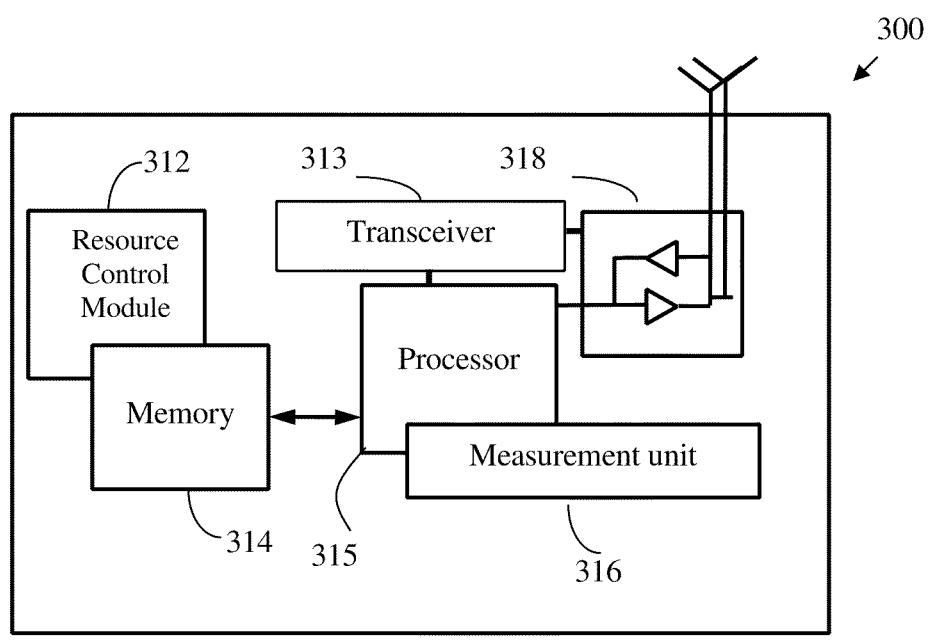
FIG. 3 illustrates an example wireless apparatus for support of secondary communication mode for coordinated network deployment in accordance with an example embodiment of the invention.

An example embodiment of the present invention and its potential advantages are understood by referring to FIGS. 1 through 3 of the drawings.

FIG. 1 illustrates an example local area network 100 in accordance with an example embodiment of the invention. The example network 100 includes four base stations, labeled as 102, 106, 108 and 112 respectively. The example network 100 also has a number of user equipments (UEs), including the UE 110 and the UE 104. The network 100 may be deployed in an environment such as a large office building, a school campus, a shopping center, an apartment complex, and the like.

In one example embodiment, the UE 110 is associated with the home base station 102 and the UE 104 is associated with its home base station 106. While the UE 110 is in a downlink mode, receiving data from the home base station 102, the neighbor UE 104 is in an uplink mode and transmitting data. Moreover, other two base stations 108 and 112 are in the downlink mode and transmitting data as well. As such, the UE 110, while receiving data from its home base station 102, may receive interference signals from the neighbor UE 104, and the two other base stations 108 and 112. If the example network 100 was deployed in an uncoordinated manner, it would be difficult to minimize or cancel the interferences.

In another example embodiment, the example network 100 was deployed in a coordinated manner. When the UE 110 roams into the local area network 100 and upon detecting the presence of the local area network and a possibility to establish D2D communications with neighbor network element such as the UE 104, the UE 110 switches to a secondary communication mode. The UE 110 may signal to the neighbor UE 104 and the base stations 102, 108 and 112 its synchronized channels that may be used for downlink reception, uplink reception, downlink transmission and uplink transmission. The UE 110 may receive signaling messages from the neighbor UE 104 and the base station 102, 108 and 112, the signaling messages that inform the UE 110 of their synchronized resources. The synchronized resources in the secondary communication mode may have been configured in such a way that a designated channel for pilot signals, control signals or data signals are synchronized in a frequency domain, a time domain or both, and the signals on the synchronized resources are made orthogonal to each other and to a third interfering signal. In the secondary communication mode, the UE 110 sends a pilot signal to the base station 102 or its peer UE 104 on a fixed pilot channel, and may receive different pilot signals on the same channel from the neighbor UE 106 and the base stations 108 and 112. The interferences among the network elements UE 110, UE 102, base station 102, 108 and 112 are either canceled or minimized due to orthogonality of the signals the UE 110 receives to the interference signals in the synchronized transmission mode.

FIG. 2 illustrates an example method 200 for the secondary communication mode to facilitate coordinated network deployment in accordance with an example embodiment of the invention. The method 200 may include mapping a first transmission channel to an existing channel at block 212, switching to a synchronized transmission mode at block 214 and signaling the neighbor network elements at block 216. The method 200 may also include receiving a first signal on the mapped first transmission channel at block 218, transmitting a second signal on the mapped first transmission channel at block 218 and receiving an interfering signal on the mapped first transmission channel at block 220.

In an example embodiment, mapping the first transmission channel to the existing channel at block 212 may include mapping an uplink channel to an existing downlink channel of the network element in such a way that they are synchronized in the frequency domain, the time domain or both. Mapping the first transmission channel at block 212 may also include using the same radio frame structure, signal structure, and control structure of the existing uplink or downlink channel. In one embodiment, mapping the first transmission channel to the existing channel at block 212 includes mapping the uplink or downlink transmission channel to a fixed location of the existing downlink or uplink channel. This may facilitate the coordination of resource allocations among network elements, because each network element may simply allocate the fixed resource to a particular type of signal such as a beacon signal. In another embodiment, mapping the uplink or downlink channel to existing channel at block 212 includes mapping to a downlink or an uplink pilot channel or control channel. The mapping may be performed at design time or dynamically.

Table 1 shows an example embodiment of mappings between existing LTE physical layer uplink channels and the synchronized transmission channel in the secondary communication mode.

TABLE 1

Example implementation for channel mapping

| MAC | Existing LTE physical channels | Transmission channels in secondary communication mode |
|---|---|---|
| UL-SCH | PUSCH | PDSCH |
| Random access channel | RACH Preamble: PRACH | RACH Preamble: Options: PBCH/PSS/SSS/PDSCH |
| | RACH Message: PUSCH | RACH Message3: PDSCH |
| | PUCCH Format 1/1a/1b (ACK/NACK, SR) | Option 1: PHICH Option 2: PDCCH |
| | PUCCH Format 2/2a/2b (CQI) | PDCCH |
| | UL Demodulation (DM) RS (PUSCH) | DM RS (PDSCH) |
| | Sounding reference signal | CSI RS |

The example embodiment of mappings between existing LTE physical layer uplink (UL) channels and transmission channel in secondary communication mode may include a mapping between a physical uplink shared channel (PUSCH) signal and a downlink physical downlink shared channel (PDSCH) signal, and a mapping between an uplink random access channel (RACH) preamble and a downlink RACH preamble. The mappings may also include a mapping between one of a physical uplink control channel (PUCCH) format acknowledgement (ACK) signal, a PUCCH format negative acknowledgement (NAK) signal and a PUCCH format reference signal and one of a downlink physical hybrid automatic repeat request (ARQ) indicator channel (PHICH) signal and a physical downlink control channel (PDCCH) signal. The mappings may also include a mapping between an uplink demodulation reference signal and a downlink demodulation reference signal and a mapping of an uplink sounding reference signal to a downlink channel state information (CSI) reference signal.

In an example embodiment, switching to the secondary communication mode at block 214 may include detecting a network configuration and communication mode that is suitable for the secondary communication mode. Criteria for switching may include a suitable communication mode such as a D2D communication mode, a presence of a local area network and the like. In one example embodiment, the D2D communication mode in a local area network is suitable for the secondary communication mode. The secondary communication mode may comprise a secondary transmission mode and a secondary receiving mode. In the secondary transmission mode, an uplink transmission channel of a network element is synchronized with a downlink channel of the same network element in one of the time domain or the frequency domain in such a way that they share a same time slot, have an at least partially overlapping frequency band, or both. Similarly in the secondary receiving mode, a downlink transmission channel of the network element is synchronized with an uplink channel of the same network element in one of the time domain or the frequency domain in such a way that they share a same time slot, an at least partially overlapping frequency band, or both. In the secondary communication mode, the network element may also synchronize its resources with other neighbor network elements in a manner similar to that described above.

In an example embodiment, signaling the neighbor network elements at block 216 may include sending signaling message to inform the neighbor network elements of the secondary communication mode. Signaling the neighbor network elements at block 216 may include signaling the neighbor network elements on its channel allocations and other resource allocation. Signaling the neighbor network elements at block 216 may also include using one of the signaling methods for sending the signaling message. The signaling methods may include a broadcasted system information signaling, a UE specific higher layer configuration signaling such as radio resource control (RRC) signaling, and a UE specific dynamic configuration signaling such as PDCCH and the like. The neighbor network elements may include a LTE-A mobile station, a LTE-A base station, a LTE-A access point in D2D communication mode, and the like.

Receiving a first signal on the mapped transmission channel at block 218 may include receiving a pilot or control signal on the mapped transmission channel from the associated neighbor network element. In one embodiment, receiving the first signal include receiving a LTE-A pilot signal or a LTE-A control signal on a mapped LTE-A downlink pilot channel or a LTE-A downlink control channel.

In an example embodiment, transmitting a second signal on the mapped transmission channel at block 220 may include transmitting an uplink signal to a neighbor network element in a D2D communication mode. In one embodiment, transmitting the second signal on the transmission channel at block 220 may include transmitting a downlink or an uplink LTE-A reference signal or LTE-A control signal to a peer-to-peer network element. Receiving an interfering signal on the mapped uplink channel at block 222 may include receiving an inferring pilot or control signal transmitted on the same transmission channel from a neighbor network element. The mapped transmission channel is configured in such a way that the interfering signal is orthogonal to the first signal and the second signal.

In one example embodiment, the method 200 may be implemented in the UE 110, and the base station 102 of FIG. 1 or in the wireless apparatus 300 of FIG. 3. The method 200 is for illustration only and the steps of the method 200 may be combined, divided, or executed in a different order than illustrated, without departing from the scope of the invention of this example embodiment.

FIG. 3 illustrates an example apparatus for support of the secondary communication mode in a local area network environment in accordance with an example embodiment of the invention. FIG. 3 illustrates a simplified block diagram of an example wireless network element that is suitable for use in practicing the exemplary embodiments of at least part of this invention. In FIG. 3, the wireless apparatus 300 may include a processor 315, a memory 314 coupled to the processor 315, and a suitable transceiver 313 (having a transmitter (TX) and a receiver (RX)) coupled to the processor 315, coupled to an antenna unit 318. The memory 314 may store programs such as a resource control module 312. The wireless apparatus 300 may be at least part of a $4^{th}$ generation mobile station, a LTE-A compliant user equipment, a LTE-A compliant base station, and a LTE-A compliant access point.

The processor 315 or some other form of generic central processing unit (CPU) or special-purpose processor such as digital signal processor (DSP), may operate to control the various components of the wireless apparatus 300 in accordance with embedded software or firmware stored in memory 314 or stored in memory contained within the processor 315 itself. In addition to the embedded software or firmware, the processor 315 may execute other applications or application modules stored in the memory 314 or made available via wireless network communications. The application software may comprise a compiled set of machine-readable instructions that configures the processor 315 to provide the desired functionality, or the application software may be high-level software instructions to be processed by an interpreter or compiler to indirectly configure the processor 315.

In one example embodiment, the resource control module 312 is configured to map a first transmission channel to an existing channel of a network element in such a way the first transmission channel is synchronized in either the time domain or the frequency domain with an existing channel. The first transmission channel is either a downlink transmission channel or an uplink transmission channel; and the existing channel is an uplink transmission channel or a downlink transmission channel. In another embodiment, the resource control module 312 is also configured to map the transmission channel to a LTE-A downlink physical channel structure that uses one of a single-carrier frequency division multiple access (SC-FDMA) transmission and an orthogonal frequency division multiple access (OFDMA) transmission. In another embodiment, the resource control module 312 is configured to map a plurality of reference signal symbols to at least one prefixed position of a downlink channel quality indication (CQI) reference signal, in part of the bandwidth allocated to a user equipment.

In one embodiment, the resource control module 312 is configured to map an uplink transmission channel to a downlink transmission channel or to map a second downlink transmission channel to a second uplink transmission channel. The uplink transmission channel and the downlink transmission channel are reference signal channels or control channels and the second downlink channel and the second uplink channel are reference signal channels or control channels.

In another embodiment, the resource control module 312 is configured to switch to a secondary communication mode from a regular communication mode. In the regular communication mode, an uplink transmission and a downlink transmission are carried on an uplink channel and a downlink channel separately. The secondary communication mode may be a secondary transmission mode or a secondary receiving mode. Switching to the secondary communication mode may include detecting a presence of a local area network or a device-to-device communication mode. In another embodiment, the resource control module 312 is configured to signal to at least one neighbor network element of the secondary communication mode. Signaling the neighbor network element include using one of a broadcasted system signaling, a user equipment (UE) specific radio resource control signaling, and a UE specific dynamic signaling to send a signaling message to at least one of an associated base station and an associated UE in a device-to-device mode of operation. The resource control module 312 is also configured to switch to a secondary communication mode.

The transceiver 313 is for bidirectional wireless communications with another wireless network element. The transceiver 313 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 315 or other central processing unit. In some embodiments, the transceiver 313, portions of the antenna unit 318, and an analog baseband processing unit may be combined in one or more processing units and/or application specific integrated circuits (ASICs).

In an example embodiment, the transceiver 313 is configured to receive a first signal on the mapped first transmission channel from an associated network element. The first signal may be a sounding reference signal in a full or a partial bandwidth, using a same or different sequence as a downlink sounding reference signal. In one embodiment, the transceiver 314 is configured to bypass a discrete fourier transform block (DFT) or inverse TDF block when the SC-FDMA transmission is in use. The transceiver 313 may be further configured to transmit a second signal on the mapped first transmission channel to another associated network element. The first associated network element and the second associated network element are neighbor network elements and the first signal is orthogonal to the second signal. The first signal and the second signal may be reference signals, control signals or data signals. Furthermore, the transceiver 313 is configured to receive an interfering signal on the first transmission channel and the interfering signal is orthogonal to the first signal or the second signal. The transceiver 313 may also receive the reference signal in a staggered reference signal structure.

The antenna unit 318 may be provided to convert between wireless signals and electrical signals, enabling the wireless apparatus 300 to send and receive information from a cellular network or some other available wireless communications network or from a peer wireless network element. In an embodiment, the antenna unit 318 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 318 may include antenna tuning and/or impedance matching components, RF power amplifiers, and/ or low noise amplifiers.

As shown in FIG. 3, the wireless apparatus 300 may further include a measurement unit 316, which measures the signal strength level that is received from another wireless network element, and compare the measurements with a configured threshold. The measurement unit may be utilized by the wireless apparatus 300 in conjunction with various exemplary embodiments of the invention, as described herein.

In general, the various exemplary embodiments of the wireless apparatus 300 may include, but are not limited to, part of a base station, mobile station, or a wireless network element having wireless communication capabilities, portable computers having wireless communication capabilities, Internet appliances permitting wireless Internet access and browsing, as well as portable units or terminals that incorporate combinations of such functions. In one embodiment, the wireless apparatus 300 may be implemented in either the UE 110 or the access point 102.

Without in any way limiting the scope, interpretation, or application of the claims appearing below, a technical effect of one or more of the example embodiments disclosed herein is a flexibility for a network element to cancel or minimize interference on shared uplink or downlink channels, because interference becomes better structured. Another technical effect of one or more of the example embodiments disclosed herein is to use a single receiver to receive downlink signal from a base station and receive an uplink signal from a peer network element. For example, in TDD mode, UE may only need a single receiver which can receive both downlink signal and modified or synchronized uplink signal using the same receiver chip. Another technical effect of one or more of the example embodiments disclosed herein is to facilitate coordinated development of LTE-A and TDD-enabled network elements in a network such as local area network.

Embodiments of the present invention may be implemented in software, hardware, application logic or a combination of software, hardware and application logic. The software, application logic and/or hardware may reside on a LTE-a user equipment, a mobile station or an access point at a local area network. If desired, part of the software, application logic and/or hardware may reside on a user equipment, part of the software, application logic and/or hardware may reside on a base station, and part of the software, application logic and/or hardware may reside on an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    mapping a first transmission channel to an existing channel of a network element in a first communication mode, where the first transmission channel is mapped in both frequency and time resources;
    signaling at least one neighbor network element in a secondary communication mode to associate the network element with the at least one neighbor network element;
    switching the network element to the secondary communication mode which is one of a secondary transmission mode and a secondary receiving mode; and
    receiving a first signal on the mapped first transmission channel from the at least one associated neighbor network element;
    wherein mapping the first transmission channel further comprises at least one of:
    a mapping between a physical uplink shared channel (PUSCH) signal and a physical downlink shared channel (PDSCH) signal;
    a mapping between an uplink random access channel (RACH) preamble and a downlink RACH preamble;
    a mapping between one of physical uplink control channel (PUCCH) formats for acknowledgement (ACK) signal, negative acknowledgement (NAK) signal, scheduling request (SR) and channel quality indicator (CQI) and one of a downlink physical hybrid ARQ indicator channel (PHICH) signal and a downlink physical downlink control channel (PDCCH) signal;
a mapping between an uplink demodulation reference signal and a downlink demodulation reference signal; and
a mapping between an uplink sounding reference signal and a downlink channel state information (CSI) reference signal.

2. The method of claim 1, further comprising transmitting a second signal on the mapped first transmission channel to the at least one associated neighbor network element, wherein the first transmission channel is synchronized in at least one of a time domain and a frequency domain with the existing channel and has at least a partially overlapping frequency band with the existing channel.

3. The method of claim 2, wherein mapping the first transmission channel to the existing channel further comprises at least one of
mapping an uplink transmission channel to a downlink transmission channel; and
mapping a second downlink transmission channel to a second uplink transmission channel, wherein the uplink transmission channel and the downlink transmission channel are one of reference signal channels, control channels and data channels and; the second downlink channel and the second uplink channel are one of reference signal channels, control channels and data channels.

4. The method of claim 2, further comprising receiving an interfering signal on one of the first transmission channel and the existing channel wherein at least one of the first signal and the second signal is orthogonal to the interfering signal.

5. The method of claim 1 wherein signaling the at least one neighbor network element further comprises using one of a broadcasted system signaling, a user equipment (UE) specific radio resource control signaling, and a UE specific dynamic signaling to send a signaling message to at least one of an associated base station and an associated UE in a device-to-device mode of operation.

6. The method of claim 1 wherein switching to the secondary communication mode further comprises switching to the secondary communication mode from a regular communication mode in which an uplink transmission and a downlink transmission are carried on an uplink channel and a downlink channel separately.

7. The method of claim 1 wherein switching to the secondary communication mode further comprises switching to the secondary communication mode based on criteria including detecting a presence of at least one of a local area network, a device-to-device communication mode, and an access point-to-access point communication mode.

8. The method of claim 1 wherein receiving the first signal further comprises receiving a reference signal in a staggered reference signal structure.

9. An apparatus, comprising:
at least one processor; and
at least one memory including computer program code,
the at least one memory and the computer program code configured to, with the at least one processor, cause the apparatus to perform at least the following:
map a first transmission channel to an existing channel of a network element in a first communication mode, where the first transmission channel is mapped in both frequency and time resources;
switch the network element to a secondary communication mode which is one of a secondary transmission mode and a secondary receiving mode;
signal at least one neighbor network element in the secondary communication mode to associate the network element with the at least one neighbor network element; and
receive a first signal on the first transmission channel from the at least one associated neighbor network element;
wherein the at least one processor and at least one memory are further configured to perform at least one of:
a mapping between a physical uplink shared channel (PUSCH) signal and a physical downlink shared channel (PDSCH) signal;
a mapping between an uplink random access channel (RACH) preamble and a downlink RACH preamble;
a mapping between one of physical uplink control channel (PUCCH) formats for acknowledgement (ACK) signal, negative acknowledgement (NAK) signal, scheduling request (SR) and channel quality indicator (CQI) and one of a downlink physical hybrid ARQ indicator channel (PHICH) signal and a downlink physical downlink control channel (PDCCH) signal;
a mapping between an uplink demodulation reference signal and a downlink demodulation reference signal; and
a mapping between an uplink sounding reference signal and a downlink channel state information (CSI) reference signal.

10. The apparatus of claim 9 wherein the first transmission channel is one of a downlink transmission channel and an uplink transmission channel, and the existing channel is one of a second uplink transmission channel and a second downlink transmission channel.

11. The apparatus of claim 9 wherein the at least one processor and at least one memory are further configured to map the first transmission channel to a long-term-evolution-Advance (LTE-A) downlink physical channel structure that uses one of a single-carrier frequency division multiple access (SC-FDMA) transmission and an orthogonal frequency division multiple access (OFDMA) transmission.

12. The apparatus of claim 9, wherein the at least one processor and at least one memory are further configured to bypass a discrete fourier transform (DFT) block or inverse DFT block when a SC-FDMA transmission is in use.

13. The apparatus of claim 9, wherein the network element is one of a base station, an access point, and a peer mobile station and wherein the first signal is a sounding reference signal in a full or a partial bandwidth, using a same or different sequence as a downlink sounding reference signal.

14. The apparatus of claim 9 wherein the apparatus is at least part of a mobile station, a base station, and an access point.

15. The apparatus of claim 9, wherein the at least one processor and at least one memory are further configured to map a plurality of reference signal symbols to at least one prefixed position of a downlink channel quality indication (CQI) reference signal, in a part of bandwidth allocated to the network element.

16. The apparatus of claim 9 wherein the first signal and a second signal are one of reference signals, control signals and data signals.

* * * * *